United States Patent [19]

Itoh et al.

[11] Patent Number: 4,994,842

[45] Date of Patent: Feb. 19, 1991

[54] CAMERA HAVING A CONVERTER-ATTACHABLE ZOOM LENS

[75] Inventors: Masatoshi Itoh; Hidenori Fukuoka; Kazuhiko Kojima, all of Osaka, Japan

[73] Assignee: Minolta Camera Kabushiki Kaisha, Osaka, Japan

[21] Appl. No.: 424,655

[22] Filed: Oct. 19, 1989

Related U.S. Application Data

[63] Continuation of Ser. No. 253,387, Oct. 3, 1988, abandoned, which is a continuation of Ser. No. 152,770, Feb. 5, 1988, abandoned.

[30] Foreign Application Priority Data

Feb. 6, 1987 [JP] Japan .................................. 62-26065
Feb. 6, 1987 [JP] Japan .................................. 62-26066

[51] Int. Cl.$^5$ ....................... G03B 13/36; G03B 5/00; H04N 5/232
[52] U.S. Cl. ............................... 354/402; 354/195.12; 358/227
[58] Field of Search ............... 354/402, 406, 407, 408, 354/286, 195.1, 400, 195.12; 358/227, 225; 352/140; 350/429, 430, 422, 255, 257

[56] References Cited

U.S. PATENT DOCUMENTS

| | | | |
|---|---|---|---|
| 4,110,005 | 8/1978 | Bohm et al. | 350/184 |
| 4,225,219 | 9/1980 | Shimizu | 354/25 |
| 4,531,158 | 7/1985 | Murakami | 358/227 |
| 4,572,642 | 2/1986 | Yamamoto et al. | 354/402 |
| 4,611,244 | 9/1986 | Hanma et al. | 358/227 |
| 4,728,973 | 3/1988 | Taniguchi et al. | 354/79 |
| 4,728,980 | 3/1988 | Nakamura et al. | 354/286 X |

Primary Examiner—W. B. Perkey
Attorney, Agent, or Firm—Price, Gess & Ubell

[57] ABSTRACT

When a teleconverter is attached, the variator is once moved to the tele end regardless of its position. Thereafter, by the input of zoom operation key, the movement of the variator to the wide side, namely zooming, becomes possible with the range of movement automatically limited in a prescribed range in order to prevent shading due to the attachment of the teleconverter. Meanwhile, if a wide converter is attached, the variator is similarly moved to the wide end. Thereafter, the movement of the variator is prohibited regardless of the presence/absence of the input of the zoom operation key. When the teleconverter or the wide converter is detached, the limit of the range of movement or prohibition of the movement of the variator is cancelled and usual zooming operation is retrieved.

48 Claims, 8 Drawing Sheets

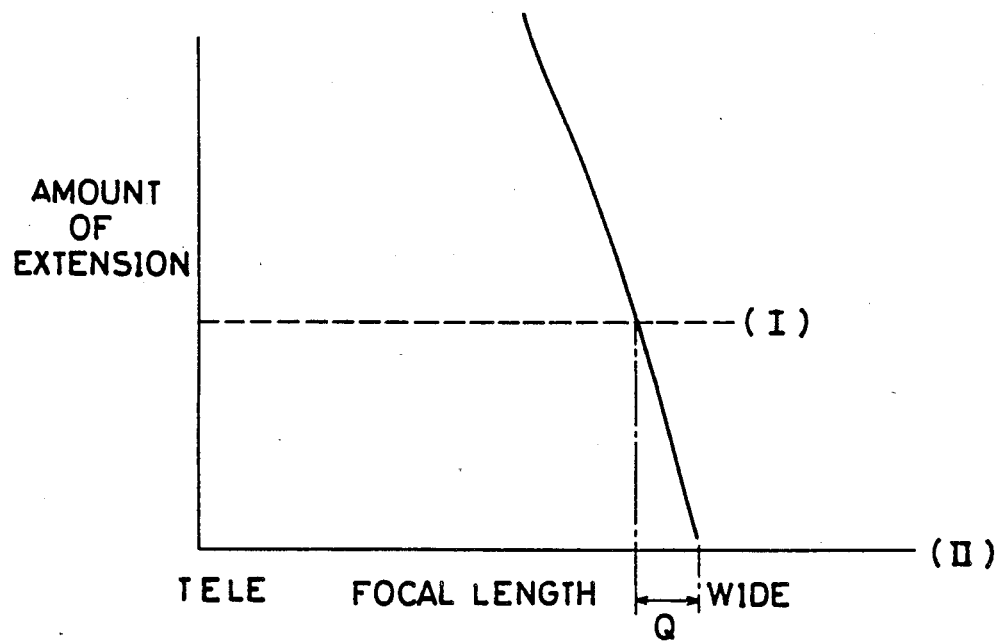

CAMERA HAVING A CONVERTER-ATTACHABLE ZOOM LENS

This is a continuation of application Ser. No. 253,387, filed Oct. 3, 1988, which is a continuation of application Ser. No. 152,770, filed Feb. 5, 1988, both now abandoned,

BACKGROUND OF THE INVENTION

1. Field of the Invention

The present invention relates to a camera having a zooming mechanism and, more specifically, it relates to an auto focus camera with a zoom lens unit to the front end of which a converter for variable focal length can be attachable.

2. Description of the Prior Art

Conventionally, when a lens for variable focal length such as a converter is attached to the front side of a zoom lens unit, the position of a variator for the zoom lens unit is not changed before and after the attachment of the converter. For example, if we use a 6 times zoom lens unit with the focal length of 9 mm to 54 mm as a zoom lens unit, and attach a teleconverter of 1.5 magnification rate, the focal length will be only about 45 mm when the focal length is set at 30 mm directly before the attachment of the converter.

In that case, the attachment of the teleconverter has no considerable effect. The effect of the attachment of the teleconverter is maximized when the converter is attached with the variator of the zoom lens unit set at an end of a telephoto range (hereinafter referred to as the tele end). Therefore, a photographer must move the variator of the zoom lens unit to the tele end before the attachment of the teleconverter or he must move the variator to the tele end after the attachment of the teleconverter. The same problem occurs when a wide converter is attached.

Meanwhile, in attaching a converter in front of the zoom lens unit, the converter of a large diameter has been used in order that portions of the beam is not shaded by the converter. Particularly, in attaching a converter in front of a zoom lens unit, the light path changes along with the movement of the variator, so that a converter should be prepared which is designed not to shade the light path in the entire zooming range. In that case, the diameter of the converter will be still larger.

The converter having a lens of such large diameter is large-sized and has considerable weight. Therefore, even if the zoom lens unit is made compact, the camera as a whole will be very large when such converter is attached thereto. On the contrary, if a small and light converter is attached, shading may occur as described above, or sufficient compensation cannot be provided by a compensator. More specifically, afocal design may be employed for a teleconverter for zooming, however, in that case shading sometimes occurs in a portion of a zooming range defined by the movement of the variator, if the converter is made with small diameter in order to make it compact. Afocal designed wide converter has a large diameter, so that a camera as a whole will be large-sized when the same is attached to the camera. On the other hand, although a wide converter which is not afocal designed is compact, the necessary moving amount of the compensator corresponding to the zoom amount will be extremely large and the compensation by a compensator becomes substantially difficult.

SUMMARY OF THE INVENTION

Therefore, an object of the present invention is to provide a camera having a zoom lens unit in which the variator need not be moved when a converter is attached.

In order to attain the above described object, the camera in accordance with the present invention comprises a first lens as the variator included in a zoom lens unit freely movable in a prescribed range for varying a focal length of the zoom lens unit, a second lens as the converter detachably attached between the first lens and an object, which has magnification varying function of further changing the focal length of the zoom lens unit by the attachment, attachment detecting means for detecting the attachment and the magnification varying function of the second lens, position determining means for determining a prescribed position of the first lens, wherein the effect of the attachment of the second lens is maximized, corresponding to the detected magnification varying function of the second lens in response to the detection output of the attachment detecting means, and moving means for moving the first lens to the determined prescribed position in response to the determination output of the position determining means.

In the camera with a zoom lens unit structured as described above, the variator is automatically moved to the prescribed position which maximizes the effect of the attachment of the converter, so that when the converter is attached, the zoom effect can be all the more enhanced and, at the same time, no operation is compelled to the photographer at that time.

Another object of the present invention is to provide a camera having a zoom lens unit in which shading or other inappropriate zooming result does not occur even if a converter formed of a lens of relatively small diameter is attached thereto.

In order to attain the above described object, the camera in accordance with the present invention comprises a first lens as the variator included in a zoom lens unit freely movable in a first prescribed range for varying a focal length of the zoom lens unit, a second lens as the converter detachably attached between the first lens and an object, which has a magnification varying function of further changing the focal length of the zoom lens unit by the attachment, attachment detecting means for detecting the attachment and the magnification varying function of the second lens, driving means for moving the first lens to an arbitrary position in the first prescribed range, and driving control means which limits the movement of the first lens by the driving means in a second prescribed range within the first prescribed range in response to the detection output of the attachment detecting means.

In the camera with a zoom lens unit structured as described above, means is provided for limiting the moving range of the variator when the converter is attached, so that the range in which shading occurs can be eliminated from the zooming range, thereby eliminating the possibility of inappropriate zooming. In addition, the converter to be attached to the zoom lens unit can be made with a lens of a small diameter, and therefore, the camera as a whole can be made compact even if the converter is attached thereto.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 9 is a graph for describing the limitation when a wide converter is attached to the structure of FIG. 1.

DESCRIPTION OF THE PREFERRED EMBODIMENT

Figure 1:
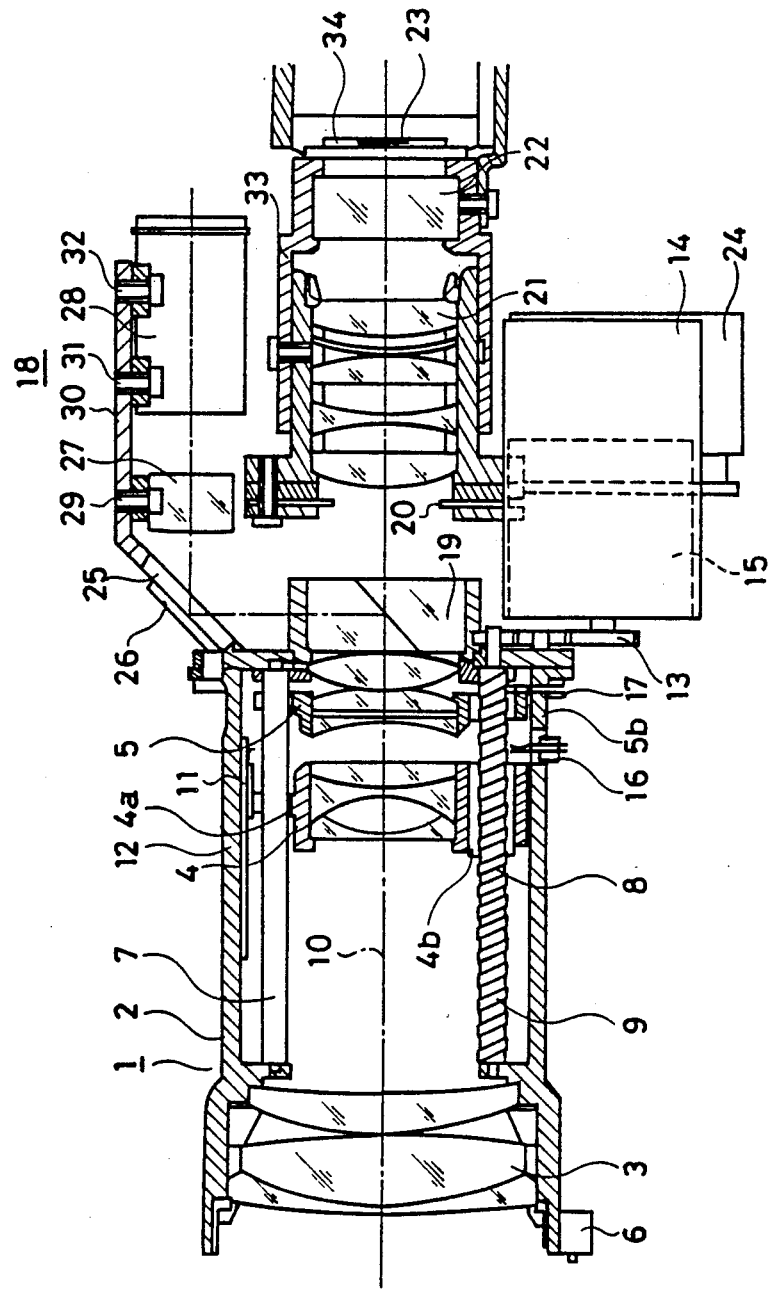
FIG. 1 is a cross sectional view of a main portion of a video camera in accordance with one embodiment of the present invention, showing the arrangement of the optical lens system.

FIG. 1 is a cross sectional view of a main portion of the video camera in accordance with one embodiment of the present invention.

Referring to the figure, the zoom lens unit 1 comprises a front lens 3, a variator 4 for varying focal length and a compensator 5 for focus adjustment arranged in a fixed cylinder 2 in this order from the front side. The front lens 3 is fixed and the variator 4 and the compensator 5 are movably arranged as will be described in the following. The variator 4 is constituted by a variable-magnification lens group and changes the focal length by the movement thereof. The compensator 5 is constituted by a focus lens group and serves to compensate the focusing position caused by the movement of the variator 4. As for the compensator, one which is moved by a cam mechanism in association with the variator has been conventionally known. In this embodiment, however, the compensator is structured such that it is driven electrically by the output of the focus detecting apparatus, as will be described in the following. In addition, the compensator and the variator are moved by the driving means which are independent from each other. The front end portion of the zoom lens unit 1 is ready for the attachment of accessories for varying magnification such as teleconverter, wide converter and so on, and in addition, detecting means 6 for determining the kind of the accessory, namely, the magnification varying function and the like is provided to the front end of the zoom lens unit 1. The detecting means 6 is constituted by, for example, two switches. Meanwhile, a concave portion is provided on the converter so that predetermined one switch of these switch pieces is not pressed by the converter, thereby enabling the detection of the kind of the accessing. In the fixed cylinder 2, a guide rod 7 and first and second lead screws 8 and 9 are arranged in the direction parallel to the light axis 10. The guide rod 7 is arranged in the longitudinal direction of the fixed cylinder 2 adjacent to the inner surface of the fixed cylinder 2 and both ends of the rod are fixed. In the similar manner, the first and second lead screws 8 and 9 are shown on the same line. However, in the actual application, they are arranged on different positions in the direction vertical to the plane of the figure and freely rotatable by motors 14 and 15, respectively, which will be described in the following.

The variator 4 has a concave groove 4a in one portion thereof and is slidably incorporated in the guide rod 7 by means of this concave groove, and it moves guided by the guide rod 7 in the movement to the direction along the light axis 10 (left and right direction in the figure). The variator 4 has an engaging portion 4b including a thread groove on the side opposite to the concave groove and is engaged with the first lead screw 8 through this engaging portion 4b. In addition, sliding brush 11 is mounted on the variator 4, which slides on a contact piece of a zoom encoder 12 which is provided on the inner surface of the fixed cylinder 2. The structure and function of a zoom encoder 12 will be described in detail in the following with reference to FIG. 4. The compensator 5 similarly has a concave groove and is slidably incorporated in the guide rod 7 by means of the concave groove, and the other side is engaged with the second lead screw 9 through the engaging portion 5b. The first lead screw 8 for driving the variator is connected to a zoom motor 14 through a gear mechanism 13 and is rotated by the rotation of the zoom motor 14. The second lead screw 9 for driving the compensator is connected to the AF motor 15 through a gear mechanism, not shown, and is rotated by the rotation thereof. A limit switch 16 for the side adjacent to the variator and a limit switch 17 for the side distant from the variator are provided on the zoom lens unit 1 as shown in the figure, for limiting the range of movement of the compensator 5. The body of the camera 18 comprises a photographing optical system constituted by a distance measuring prism 19, a diaphragm 20, a master lens group 21, a low pass filter 22, a photographing CCD (charge coupled device) 23, a diaphragm control meter 24 and a focusing point detecting optical system constituted by a total reflection mirror 26 mounted on a support frame window 25, an imaging lens 27 and a focus detection module 28. The low pass filter serves to cut the optical signal around 8 MHz which causes stripe noise dependent on the number of pixels in the CCD 23. The imaging lens 27 is fixed to the support frame 30 by a screw 29 and the focus detection module 28 is fixed to the support frame 30 by screws 31 and 32 in the similar manner. The diaphragm 20, the master lens group 21 and the low pass filter 22 are fixed in a retaining cylinder 33 arranged in the camera body 18 along the light axis 10. The CCD 23 is arranged at the rear end of the retaining cylinder with a protection glass 34 interposed therebetween.

The light from the object passes through the front lens 3, variator 4 and compensator 5, and the major part of the light goes straight through the above mentioned distance measuring prism 19 and is guided to the photographing CCD 23 through the master lens group 21 and the low pass filter 22. Meanwhile, a portion of the light from the object which is turned at right angle by the distance measuring prism 19 passes through the total reflection mirror 26 and the imaging lens 27 to the focus detection module 28 which contains AF CCD line sensor and the like.

Figure 2:
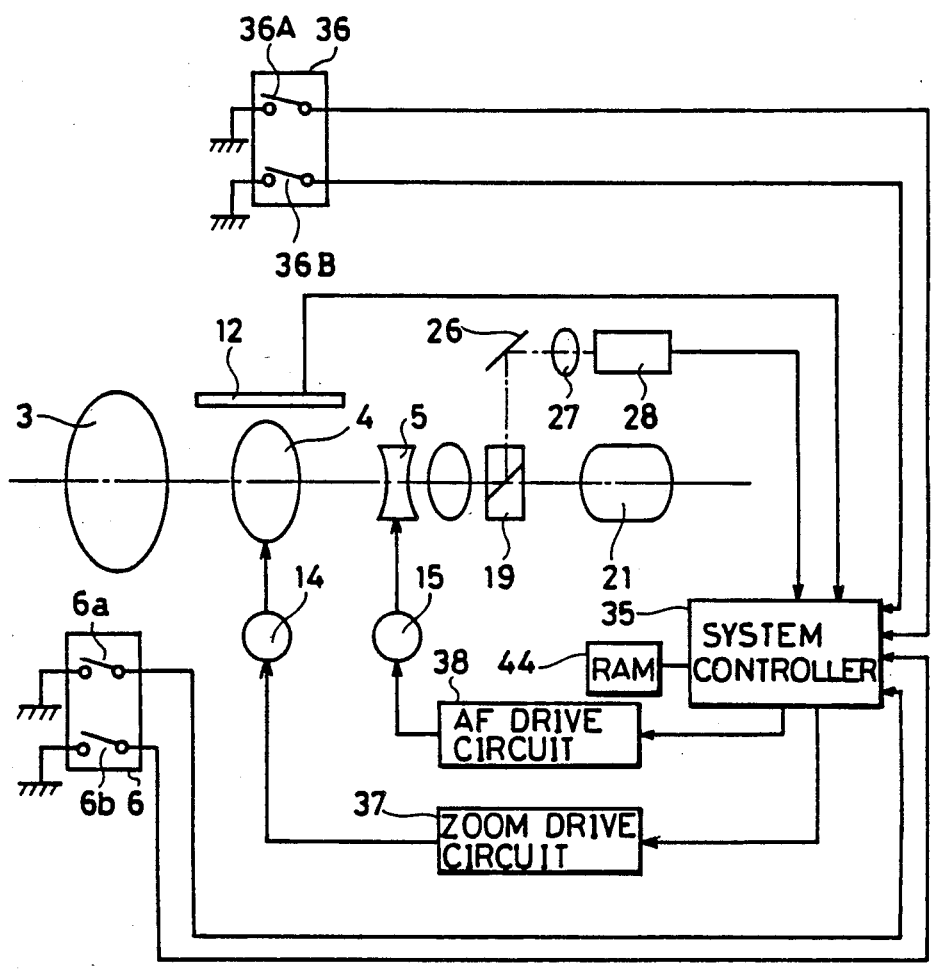
FIG. 2 is a schematic diagram of a control system centered around a system controller in accordance with one embodiment of the present invention.

FIG. 2 shows, in the form of a circuit diagram to facilitate understanding, the arithmetic operation and the driving control of the variator 4 and the compensator 5 centered around the system controller 35 consisted by a microcomputer, contained in the camera body 18. In the figure, an attachment detecting means of the converter is shown, which comprises a first switch 6a which is turned on when a teleconverter is attached and a second switch 6b which turns on when a wide converter is attached. In addition, a zoom operation key portion 36 is also shown in the figure, which comprises a teleswitch 36A which effects the zoom operation in the direction toward the tele end (hereinafter referred to as teledirection) and a wide switch 36B which effects the zoom operation in the wide direction (direction opposite to the teledirection). When a teleconverter is attached to the front end of the zoom lens unit and the first switch 6a is turned on, the system controller 35 drives the zoom motor 14 through the zoom motor drive circuit 37 so that the variator 4 moves to the teleside (the right direction in FIG. 2). When a wide converter is attached and the second switch 6b is turned on, the system controller 35 drives the zoom motor 14 through the zoom motor drive circuit 37, so that the variator 4 moves to the wide side (the left direction in FIG. 2), this time. The driving is continued until the variator 4 reaches the predetermined tele end or wide end. Thereafter, the focus detection, for example, measurement of distance, is carried out by the focus detection module 28 and the compensator 5 is moved based on the output signal through the AF drive circuit 38 and AF motor 15.

In this manner, when a converter is attached and the tele switch 36A or wide switch 36B of the zoom operation key 36 is operated with the variator set at an arbitrary position and autofocused, the variator moves to the tele direction or to the wide direction thereby effecting zooming. On this occasion, a range in which zooming is possible is limited as will be described later.

Figure 3:
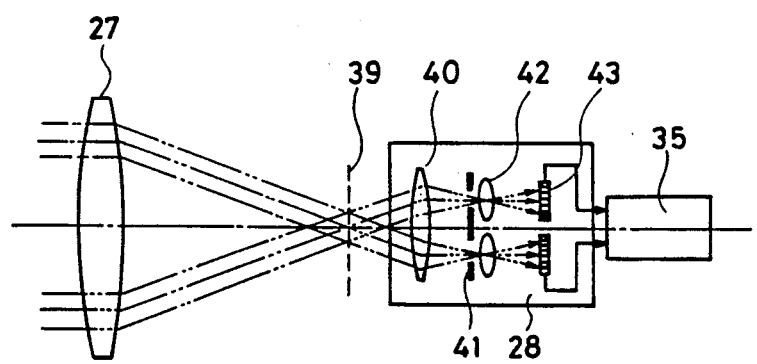
FIG. 3 shows a schematic structure of a focus detection module of FIG. 1.

FIG. 3 shows a schematic structure of the focus detection module. In the figure, the focus detection module 28 is constituted by a condenser lens 40 for condensing light which passed different pupils of the imaging lens 27, a diaphragm mask 41, a reimaged lens 42 and CCD line sensors 43. The dotted line 39 shows the equivalent position of the pickup face and the system controller 35 is connected to the CCD line sensors 43.

In FIG. 3, the light from the object entered the distance measuring system passes through the condenser lens 40, the diaphragm mask 41 and the reimaged lens 42 to form two object images on the CCD line sensors 43. The system controller 35 detects the amount and direction of the defocus from a predetermined focal point by detecting relative position relation between the two images to drive the compensator 14 in the manner as shown in FIG. 2 to attain the in-focus condition. The above mentioned focus detection is disclosed in Japanese Pat. Laying-Open No. 4914/1985 and so on, so that the detailed description thereof will be omitted.

Figure 4:
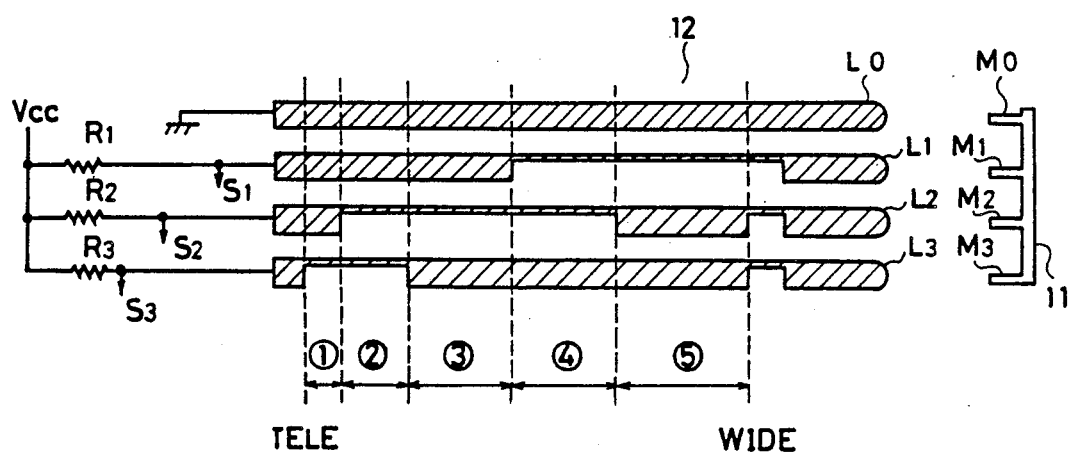
FIG. 4 shows a structure of a zoom encoder of FIG. 1.

FIG. 4 shows the structure of the zoom encoder 12 of FIG. 1. The zoom encoder 12 is provided with a contact piece portion of a conductive material formed to provide a gray code. The sliding contact piece portion comprises a common contact piece L0 and first, second and third contact pieces L1, L2 and L3 connected to the power supply $V_{cc}$ through the resistances R1, R2 and R3, respectively, and the whole is formed on, for example, a flexible printed board. The sliding brush 11 of the variator 4, which is described in the foregoing, has four contacts M0, M1, M2 and M3 integrally formed of a conductive material, which contacts with the common contact piece L0 and the first, second and third contact pieces L1, L2 and L3, respectively of the zoom encoder 12. The contact is effected at the central portion or the portion lower than the center of the contact pieces L0, L1, L2 and L3. Therefore, the contacts of the brush 11 will not be in contact with the narrow portions of the contact pieces, so that the signals S1, S2 and S3 generated at the output points become high level. On the contrary, the contacts will be in contact with the wide portions of the contact pieces, so that the potential of the output point will fall to the ground level (low level) through the brush 11 and the common contact piece L0. Consequently, the combination data (3 bit signals) of the output signals S1, S2 and S3 change variously corresponding to the shape of the first, second and third contact pieces L1, L2 and L3. The data for five zones ①, ②, ③, ④ and ⑤ defined by the combination and the data for the tele end (TELE) and wide end (WIDE) are used for detecting the position of the variator 4 and for the movement of the same.

Meanwhile, in FIG. 4, the arrangement of the tele end (TELE) side and the wide end (WIDE) side is reversed to that of FIGS. 1 and 2. Namely, in FIG. 1, the right side is the tele side and the left side is the wide side.

Figure 5:
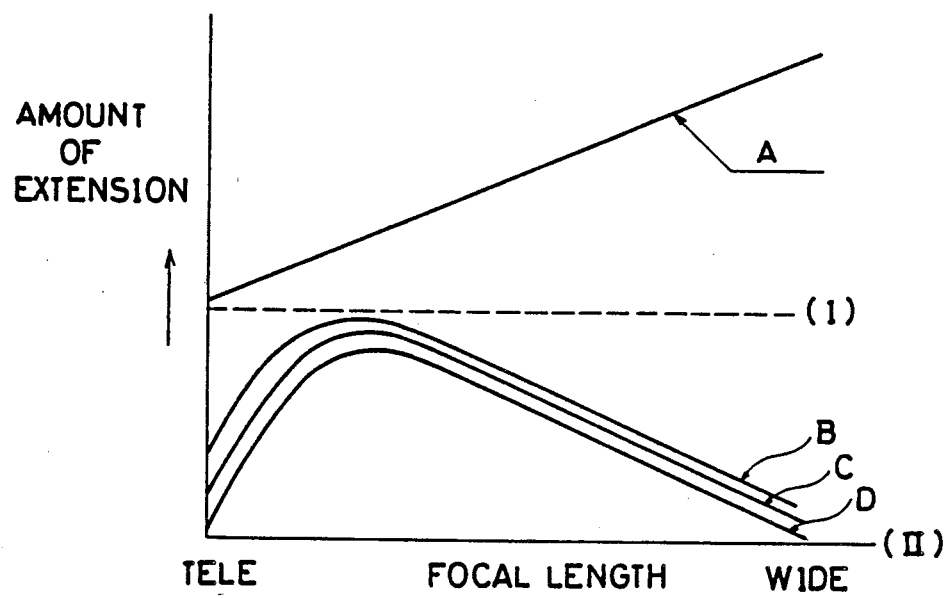
FIG. 5 shows the relation between the amount of the extension of the variator lens and the compensator lens of FIG. 1.

FIG. 5 shows the relation between the extension of the variator 4 and the compensator 5 for retaining the focusing position at a constant position when the variator is driven for zooming. In the figure, the straight line A shows the movement of the variator 4 while the curves B, C and D show the movement of the compensator 5 for different object distances, respectively. The dotted line (I) shows the position of the limit switch 16 on the side adjacent to the variator for the compensator and the dotted line (II) shows the position of the limit switch 17 on the side distant from the variator. The tele end (TELE) and wide end (WIDE) on the abscissa is arranged corresponding to FIG. 4, that is, reversed to the arrangement of FIGS. 1 and 2.

Figure 7:
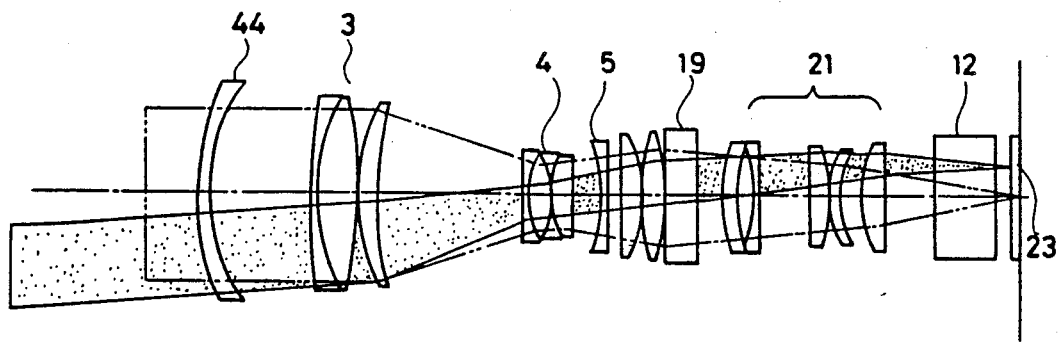
FIG. 7 is a schematic diagram showing the appropriate zooming position when a teleconverter is attached to the structure of FIG. 1.

In the following, description will be made of a case in which a teleconverter is attached to the front end of the zoom lens unit 1. When a teleconverter is attached, the end portion of the teleconverter presses the contact piece of the first switch 6a of the detecting means 6, thereby informing the system controller 35 of the attachment of the teleconverter. On receiving the teleconverter attachment signal, the system controller 35 drives the zoom motor drive circuit 37 so as to drive the variator 4 to the tele end as shown in FIG. 7. When the variator 4 moves, the brush 11 of the variator slides on the zoom encoder 12. The zoom encoder 12 is structured such that all of the 3 bit signals constituted by the output signals S1, S2 and S3 become low level (000) at the tele end (TELE), and the zone limit of the wide end (WIDE) is at the position where all of the 3 bit signals become high level (111). When the variator 4 reaches the tele end (TELE) the system controller 35 cuts the signal to the zoom motor drive circuit 37 in response to the limit signal from the encoder 12, thereby stopping the motor 14. Namely, when a teleconverter is attached, the variator of the zoom lens unit is automatically set at the tele end. Thereafter, when the zoom operation key portion 36 is externally operated, the operation signal is inputted to the system controller and the zoom motor drive circuit 37 is driven based on the signal, thereby moving the variator 4.

Meanwhile, when the teleconverter is attached, the range in which zooming is possible, therefore the movable range of the variator 4, is defined from the tele end to the border between the second zone ② and the third zone ③ of the zoom encoder 12 of FIG. 4, by the system controller 35. Therefore, when the variator 4 moves and the brush 11 thereof begins to enter from the second zone ② to the third zone ③ of FIG. 4, the movement thereof is immediately stopped regardless of the on-state of the wide switch 36B. In the movable range thus selected, the variator 4 does not move further to the wide end than the prescribed position, so that shading such as shown in the following FIG. 8 does not occur. Meanwhile, the AF motor 15 and the compensator 4 coupled thereto are driven through the AF motor drive circuit 38 by the system controller 35 in response to the focus detection signal from the focus detection module 28 to effect the in-focusing operation, even during the movement of the variator 4.

When a wide converter is attached, the second switch 6b of the detecting means 6 is turned on and the variator 4 is moved to that position in which the brush 11 of the variator reaches the wide end (WIDE) of the encoder 12 of FIG. 4, namely, the position in which the 3 bit signals become (111). Although a not afocal-designed converter lens is compact, sometimes a large movement of focal point occurs in zooming which can not be sufficiently compensated by the compensator, so that the zooming may be unabled after the movement to the wide end, as will be described in the following.

Next, the operation of the system controller 35 will be described with reference to the flow charts of FIGS. 6A and 6B.

Figure 8:
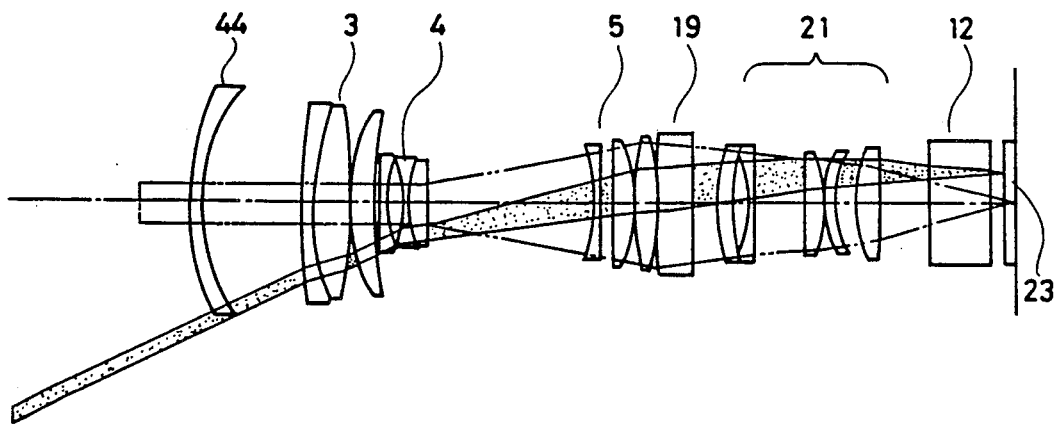
FIG. 8 is a schematic diagram showing the inappropriate zooming position in which shading occurs when a teleconverter is attached to the structure of FIG. 1.

In the video camera, power is turned on at the camera portion by operation of any one of a recording button, pause button and instant review button, not shown. At this time, the system controller 35 starts the flow shown in FIGS. 6A and 6B. Immediately after the start, the initial resetting of flag and output portion is carried out, and thereafter, it is determined whether the teleconverter is attached or not (#1). If the teleconverter is attached, then, it is determined whether a tele end flag is present or not in the file stored in a RAM 44 which is connected to the system controller 35. Since the initial resetting is carried out on the tele end flag, it is not raised at the time when the teleconverter is attached for the first time. Therefore, the teleconverter flag is set (#3) and the variator 4 is moved to the tele end (TELE) (#4). The variator 4 is moved until it reaches the tele end while it is determined whether the variator 4 is reached the tele end (TELE) or not (#5). When the variator reaches the tele end, the tele end flag is set (#6). The tele end is the position where the 3 bit signals of FIG. 4 all become low level (000) with the brush 11 of the variator 4 slides on the zoom encoder 12. When the variator 4 reaches the tele end and stops there, the defocus is measured and the compensator 5 is moved to attain the in-focus condition (#7) Thereafter, reading of zoom key (zoom operation key 36) is carried out and when tele or wide is selected by the zoom operation key 36, the variator is driven to the selected direction (#9). On this occasion, however, the first zooming operation after the variator 4 reaches the tele end is possible only in the wide direction. Thereafter, it is determined whether the teleconverter flag is set or not (#10) and, if the teleconverter flag is not set, the flow returns to (#1) and the above described flow will be repeated. If the teleconverter flag is set, then, it is determined whether it is the zone limit or not (#11). The detection of the zone limit is effected by the 3 bit signals provided by the encoder 12 and the brush 11 of FIG. 4, as described in the foregoing. In the present embodiment, the detection of the third zone 3 is the zone limit. The reason for this is that in the zoom lens unit and the teleconverter in accordance with the present embodiment, the photographing light path is designed to be the maximum when the focal length corresponds to the third zone. FIG. 7 is schematic diagram showing an appropriate zooming position when a teleconverter is attached while FIG. 8 is a schematic diagram showing an inappropriate zooming position when the teleconverter is similarly attached. In the range where the variator 4 moves to the position of FIG. 8 over the focal length corresponding to the third zone which is included in the appropriate zooming position shown in FIG. 7, the light path is shaded by the teleconverter 44 and a shading is generated at the peripheral of the pickup area. In other words, the limit focal length in which the shading does not occur corresponds to the start point of third zone on the zoom encoder 12 of FIG. 4. If it is not the zone limit, the flow returns to (#1) of FIG. 6 and the flow is repeated. If it is the zone limit, the movement of the variator 4 over the limit is prohibited (#12) and the flow returns to (#1). Since the tele end flag is raised from the second circulation, the flow branches to the YES direction at the tele end flag presence/absence check (#2) and enter AF of (#7) skipping the steps (#3) to (#6).

If it is determined that the teleconverter is not attached in the teleconverter presence/absence determination step (#1), the teleconverter flag reset is carried out (#13) and then, it is determined whether the wide converter is attached or not (#14). If the wide converter is attached, then, it is determined whether the wide end flag is set or not (#15). As in the case of the teleconverter, the wide end flag is not raised when the wide converter is attached for the first time, so that the flow proceeds to the NO direction and the wide converter flag is set (#16). After the set of the wide converter flag, the variator 4 is driven to the wide end (#17). The variator is moved to the wide end while carrying out the wide end check (#18). As for the wide end detection, the point where the 3 bit signal outputs become (111) in FIG. 4 is detected in the similar manner as the teleconverter. When the variator reaches the wide end, the wide end flag is set (#19). Since the external zoom operation is prohibited when the wide converter is attached, the zoom key reading is not carried out. Therefore, after AF (#20), the flow immediately proceeds to the teleconverter flag check (#10). Since the teleconverter flag is reset, the flow directly returns to (#1) to repeat the flow. FIG. 9 shows the amount of extension of the compensator when the wide converter is attached. As shown in the figure, when the wide converter is attached, a large amount of extension of the compensator is required for attaining the in-focused condition as compared with FIG. 5. Therefore, in the present invention, the external zoom operation is prohibited when the wide converter is attached. The reason for this is that the movement of the compensator 5 is limited (I) by the switch 16 on the side adjacent to the variator and it cannot be moved over the limit position, even though the compensator 5 should be largely moved for focusing when the wide converter is attached, as shown in FIG. 9. However, in FIG. 9, the compensator 5 is movable in the range (Q), and therefore, the variator 5 may be moved only in the small zoom range corresponding to this small range.

Figure 6A:
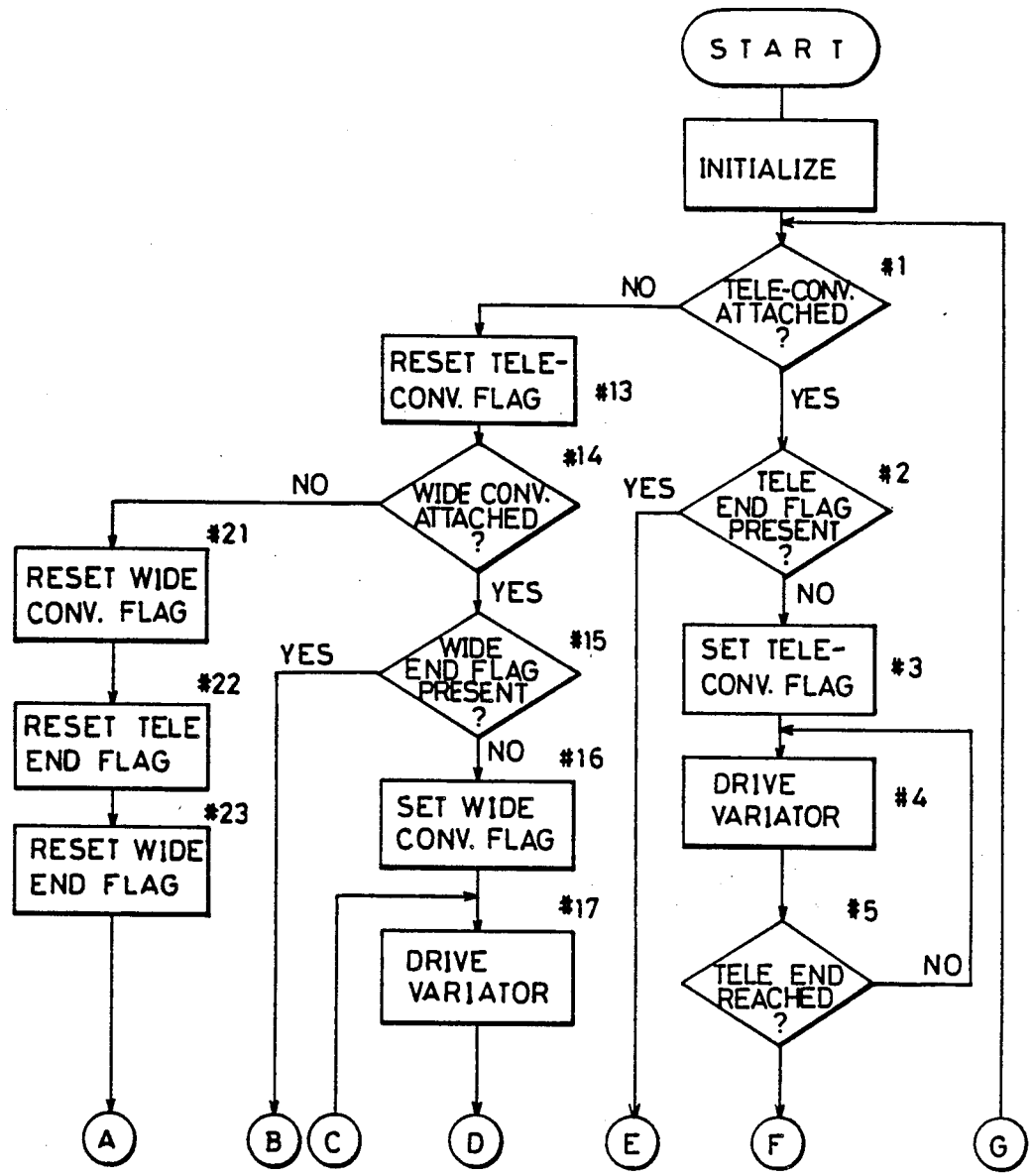
FIGS. 6A and 6B are flow charts showing the operation of the system controller in accordance with one embodiment of the present invention.
Figure 6B:
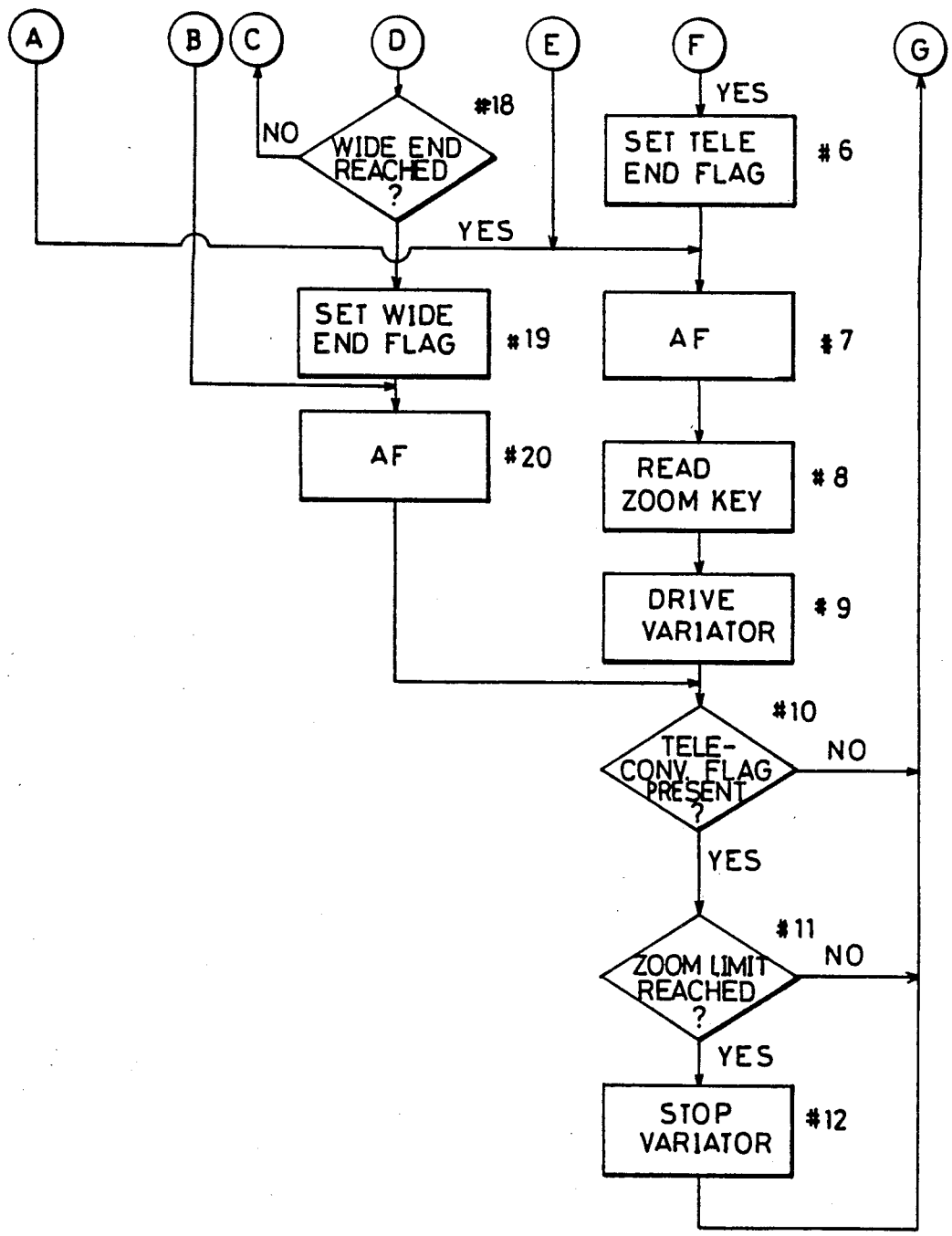

Returning to the flow charts of FIGS. 6A and 6B, if it is determined that the wide converter is not attached in the wide converter presence/absence check (#14), that is, neither teleconverter nor wide converter is attached, the wide converter flag is reset (#21), the tele end flag is reset (#22), the wide end flag is reset (#23) and the flow proceeds to the usual AF operation (#7) and thereafter, the zooming operation is made possible and the flow returns to (#1) to repeat the steps.

Although one embodiment of the present invention is described in the foregoing, the present invention is not limited to the above described embodiment and various changes and modifications are possible within the scope of the present invention recited in the claims. For example, the camera in the above embodiment is the inner focus type in which the front lens is fixed and the compensator is moved in association with the focus detection signal, it may be the front lens focus type in which the front lens is moved. In that case, the AF motor of FIG. 1 is coupled to the front lens, not to the compensator, and the compensator is mechanically coupled to the variator. In addition, although in the above embodiment the description is made of a video camera, it is not limited to this and it goes without saying that the camera may be the conventional camera with film.

What is claimed is:

1. A camera having a zoom lens unit, comprising:
   a first lens included in said zoom lens unit freely movable in a prescribed range for varying a focal length of said zoom lens unit;
   a second lens detachably attached between said first lens and an object, which has a magnification varying function of further changing the focal length of said zoom lens unit by said attachment;
   attachment detecting means for detecting the attachment of said second lens and providing an output;
   position determining means for determining a prescribed position of said first lens in response to the detection output of said attachment detecting means, wherein the effect of the attachment of said second lens is maximized with said first lens determined at said prescribed position, and
   moving means for moving said first lens to said determined prescribed position in response to the determination output of said position determining means.

2. A camera according to claim 1 wherein said second lens is a teleconverter and said determined prescribed position is the position where the focal length of said zoom lens unit due to the movement of said first lens becomes the maximum when said second lens is attached.

3. A camera according to claim 1, wherein said second lens is a wide converter and said determined prescribed position is the position where the focal length of said zoom lens unit due to the movement of said first lens becomes the minimum when said second lens is attached.

4. A camera according to claim 3, which further comprises, driving means for moving said first lens to an arbitrary position in said prescribe range, and
driving prohibition means for prohibiting the movement of said first lens by said driving means in response to the output from said attachment detecting means indicating the attachment of said second lens.

5. A camera according to claim 1, which further comprises,
   light receiving means for receiving light from said object through said first and second lenses or through said first lens, and
   a third lens movably arranged between said first lens and a light receiving portion of said light receiving means, which is electrically driven to adjust the focusing condition which is changed due to the movement of said first lens.

6. A camera according to claim 1, wherein said second lens can be selected from a plurality of kinds of lenses, and wherein said camera further comprises second means for detecting the kind of said second lens, said position determining means being further responsive to said second detecting means.

7. A camera having a zoom lens unit, comprising:
   a first lens included in said zoom lens unit freely movable in a first prescribed range for varying a focal length of said zoom lens unit;
   a second lens detachably attached between said first lens and an object, which has a magnification varying function of further changing the focal length of said zoom lens unit by said attachment;
   attachment detecting means for detecting the attachment of said second lens;
   driving means for moving said first lens to an arbitrary position in said first prescribed range; and
   driving control means which limits the movement of said first lens by said driving means in a second prescribed range within said first prescribed range in response to the detection output of said attachment detecting means.

8. A camera according to claim 7, which further comprises:
   position determining means for determining a prescribed position of said first lens, wherein the effect of the attachment of said second lens is maximized, corresponding to said detected magnification varying function of said second lens in response to the detection output of said attachment detecting means; and
   moving means for moving said first lens to said determined prescribed position in response to the determination output of said position determining means, wherein said prescribed position is within said second prescribed range.

9. A camera according to claim 8 wherein said second lens is a teleconverter and said determined prescribed position is the position where the focal length of said zoom lens unit due to the movement of said first lens becomes the maximum when said second lens is attached.

10. A camera according to claim 9, wherein "shading" occurs when said first lens is positioned in a specified range in said first prescribed range with said teleconverter attached, and wherein
   said second prescribed range is said first prescribed range other than said specified range.

11. A camera according to claim 8 wherein said second lens is a wide converter and said determined prescribed position is the position where the focal length of said zoom lens unit due to the movement of said first lens becomes the minimum when said second lens is attached.

12. A camera according to claim 11 wherein said wide converter is not afocal designed and said second prescribed range coincide with said prescribed position.

13. A camera according to claim 6, which further comprises:
light receiving means for receiving light from said object through said first and second lenses or through said first lens, and
a third lens arranged movably between said first lens and a light receiving portion of said light receiving means, which is electrically driven to adjust the focusing condition which is changed due to the movement of said first lens.

14. A camera according to claim 8, which further comprises:
light receiving means for receiving light from said object through said first and second lenses or through said first lens, and
a third lens arranged movably between said first lens and a light receiving portion of said light receiving means, which is electrically driven to adjust the focusing condition which is changed due to the movement of said first lens.

15. A camera according to claim 10, which further comprises:
light receiving means for receiving light from said object through said first and second lenses or through said first lens, and
a third lens arranged movably between said first lens and a light receiving portion of said light receiving means, which is electrically driven to adjust the focusing condition which is changed due to the movement of said first lens.

16. A camera according to claim 7, wherein said second lens can be selected from a plurality of kinds of lenses, and wherein said camera further comprises second means for detecting the kind of said second lens, said driving control means being further responsive to said second detecting means.

17. A camera comprising:
an objective lens including a first lens movable for varying the focal length of said objective lens;
driving means for driving said first lens;
a second lens detachably attached to said objective lens to lengthen the focal length of said objective lens;
attachment detecting means for detecting the attachment of said second lens, and
control means operable in response to the detection by said attachment detecting means for controlling said driving means to drive said first lens toward a predetermined position corresponding to a longer focal length.

18. A camera according to claim 17, wherein the predetermined position is a position where the longest focal length of said objective lens is obtained.

19. A camera accorfing to claim 18, wherein said objective lens includes a zoom lens.

20. A camera according to claim 18, wherein said second lens is attached on the front of said objective lens.

21. A camera according to claim 17, further comprising focal length detecting means for detecting the focal length of said objective lens by sensing the position of said first lens, wherein said control means is further responsive to said focal length detecting means.

22. A camera comprising:
an objective lens including a first lens movable for varying the focal length of said objective lens;
driving means for driving said first lens;
a second lens detachably attached to said objective lens to shorten the focal length of said objective lens;
attachment detecting means for detecting the attachment of said second lens, and
control means operable in response to the detection by said attachment detecting means for controlling said driving means to drive said first lens toward a predetermined position corresponding to a shorter focal length.

23. A camera according to claim 22, wherein the predetermined position is a position where the shortest focal length of said objective lens is obtained.

24. A camera according to claim 23, wherein said objective lens includes a zoom lens.

25. A camera according to claim 23, wherein said second lens is attached on the front of said objective lens.

26. A camera according to claim 22, further comprising focal length detecting means for detecting the focal length of said objective lens by sensing the position of said first lens, wherein said control means is further responsive to said focal length detecting means.

27. A camera comprising:
an objective lens including a movable lens;
driving means for driving said movable lens;
an attachable lens detachably attached to said objective lens to change an optical characteristic of said objective lens;
attachment detecting means for detecting the attachment of said attachment lens, and
control means operable in response to the detection by said attachment detecting means for controlling said driving means to automatically drive said movable lens to a predetermined position where the optical characteristic of said objective lens, varied by the attachment of said attachable lens, is maximized.

28. A camera according to claim 27, wherein said movable lens is a lens for varying the focal length of said objective lens.

29. A camera according to claim 28 further comprising focal length detecting means for detecting the focal length of said objective lens by sensing the position of said movable lens, said control means being further responsive to said focal length detecting means, and wherein said attachable lens is a lens to lengthen the focal length of said camera, the predetermined position being a position where the longest focal length of said objective lens is obtained.

30. A camera comprising:
an objective lens including a first lens continuously movable for varying the focal length of said objective lens and a second lens selectively provided into an optical axis of said objective lens, and having a magnification varying function of further changing the focal length of said objective lens by a predetermined magnification;
driving means for driving said first lens;

provision detecting means for detecting the provision of said second lens into the optical axis of said objective lens, and control means operable in response to the detection by said provision detecting means for controlling said driving means to drive said driving means toward a predetermined position corresponding to a longer focal length of said objective lens.

31. A camera according to claim 30, wherein the predetermined position is a position where the longest focal length of said objective lens is obtained.

32. A camera according to claim 30, wherein the predetermined position is a position where the shortest focal length of said objective lens is obtained.

33. A camera according to claim 30, further comprising focal length detecting means for detecting the focal length of said objective lens by sensing the position of said first lens, wherein said control means is further responsive to said focal length detecting means.

34. A camera comprising:
an objective lens including a first lens movable for varying the focal length of said objective lens;
driving means for driving said first lens;
a second lens detachably attached to said objective lens to change the optical characteristic of said objective lens;
attachment detecting means for detecting the attachment of said second lens, and
control means operable in response to the detection by said attachment detecting means for controlling said driving means to a position where generation of an eclipse of a light path shaded by the attachment of said second lens can be prevented.

35. A camera according to claim 34, wherein said second lens is a teleconverter lens to lengthen the focal length of said objective lens.

36. A camera according to claim 35, wherein said teleconverter lens is attached on the front of said objective lens.

37. A camera comprising:
an objective lens including a first lens movable for varying the focal length of said objective lens and a second lens movable for focus adjustment;
driving means for driving said first lens;
focus adjustment means for driving said second lens;
a third lens detachably attached to said objective lens to change the optical characteristic of said objective lens;
attachment detecting means for detecting the attachment of said third lens, and
control means operable in response to the detection by said attachment detecting means for controlling said driving means to drive said first lens to a position where the focus adjustment by said focus adjustment means is capable.

38. A camera according to claim 37, wherein said third lens is a wide-converter lens to shorten the focal length of said objective lens.

39. A camera according to claim 38, wherein said wide-converter lens is attached on the front of said objective lens.

40. A camera according to claim 39, wherein said objective lens is a zoom lens, said first lens is a variator lens, and said second lens is a compensator lens.

41. A camera comprising:
an objective lens including a first lens continuously movable for varying the focal length of said objective lens;
driving means for driving said first lens;
a second lens detachably attached to said objective lens to change the focal length of said objective lens by a predetermined magnification;
attachment detecting means for detecting the attachment of said second lens;
restriction means operable in response to the detection by said attachment detecting means to restrict the movable range of said first lens, and
control means operable in response to the detection by said attachment detecting means for controlling said driving means to drive said first lens toward a position within the range restricted by said restriction means.

42. A camera according to claim 41, wherein said second lens is attached on the front of said objective lens.

43. A camera according to claim 42, wherein said objective lens further includes a compensator lens for compensating the focus deviation caused by the movement of said first lens.

44. A camera comprising:
an objective lens including a movable lens;
driving means for driving said movable lens;
an attachable lens detachably attached to said objective lens to change an optical characteristic of said objective lens, the attachment thereof causing the characteristic of said objective lens to be inoperative when said movable lens is positioned outside of a predetermined movable range;
attachment detecting means for detecting the attachment of said attachable lens, and
control means, operable in response to the detection by said attachment detecting means, for controlling said driving means to drive said movable lens to the predetermined movable range.

45. A camera according to claim 39, wherein said movable lens is a lens for varying the focal length of said objective lens, and said attachable lens is a lens for multiplying the focal length of said objective lens by a predetermined multiplication.

46. A camera comprising:
an objective lens including a movable lens for varying the focal length;
driving means for driving said movable lens;
an attachable lens detachably attached to said objective lens to change an optical characteristic of said objective lens;
attachment detecting means for detecting the attachment of said attachable lens, and
control means operable in response to the detection by said attachment detecting means for controlling said driving means to drive said movable lens to a predetermined position where the opticla characteristic of said objective lens, varied by the attachment of said attachable lens, is maximized.

47. A camera comprising
an objective lens including a first lens continuously movable for varying the focal length of said objective lens;
driving means for driving said first lens;
a second lens detachably attached to said objective lens to change the foxal length of said ovjective lens by a predetermined magnification;
attachment detecting means for detecting the attachment of said second lens, and restriction means operable in response to the detection by said attachment detecting means to restrict the movalbe renge of said first lens.

48. A camera comprising:

an objective lens including a first lens continuously movable for varying the focal length of said objective lens;

driving means for driving said first lens;

a second lens detachably attached to said objective lens to change the focal length of said objective lens by a predetermined magnification;

attachment detecting means for detecting the attachment of said second lens, and control means operable in response to the detection by said attachment detecting means for controlling said driving means to drive said first lens toward a position within a restricted range.

* * * * *